(12) United States Patent
Jaiswal

(10) Patent No.: US 8,688,601 B2
(45) Date of Patent: Apr. 1, 2014

(54) SYSTEMS AND METHODS FOR GENERATING MACHINE LEARNING-BASED CLASSIFIERS FOR DETECTING SPECIFIC CATEGORIES OF SENSITIVE INFORMATION

(75) Inventor: Sumesh Jaiswal, Pune (IN)

(73) Assignee: Symantec Corporation, Mountain View, CA (US)

( * ) Notice: Subject to any disclaimer, the term of this patent is extended or adjusted under 35 U.S.C. 154(b) by 225 days.

(21) Appl. No.: 13/191,018

(22) Filed: Jul. 26, 2011

(65) Prior Publication Data

US 2012/0303558 A1 Nov. 29, 2012

(30) Foreign Application Priority Data

May 23, 2011 (IN) .............................. 706/KOL/2011

(51) Int. Cl.
*G06F 15/18* (2006.01)
(52) U.S. Cl.
USPC ........................................................... 706/12
(58) Field of Classification Search
None
See application file for complete search history.

(56) References Cited

U.S. PATENT DOCUMENTS

| | | | |
|---|---|---|---|
| 7,058,850 B2 | 6/2006 | Cochran | |
| 2002/0133738 A1 | 9/2002 | Zeigler et al. | |
| 2007/0130232 A1 | 6/2007 | Therrien et al. | |
| 2009/0232300 A1 | 9/2009 | Zucker et al. | |
| 2011/0184817 A1* | 7/2011 | Yankov et al. | 705/14.73 |

OTHER PUBLICATIONS

Tracy et al. "An Agent-based Approach to Inference Prevention in Distributed Database Systems", ICTAI, 2002, pp. 10.*
Stein et al. "Decision Tree Classifier for Network Intrusion Detection With GA-based Feature Selection", SCM Southeast Conference, 2005, pp. 136-141.*
Chang "Statistical Sensitive Data Protection and Inference Prevention with Decision Tree Methods", NRL release, 2003, pp. 3 http://citeseerx.ist.psu.edu/viewdoc/summary?doi=10.1.1.138.4951.*
Non-Final Office Action received in U.S. Appl. No. 12/558,333, dated Nov. 23, 2011.
Phillip DiCorpo et al.; User Interface and Workflow for Performing Machine Learning; U.S. Appl. No. 13/038,299, filed Mar. 1, 2011.
Amit Shinde et al.; Systems and Methods for Preventing Data Loss on External Devices; U.S. Appl. No. 12/558,333, filed Sep. 11, 2009.

* cited by examiner

*Primary Examiner* — Li-Wu Chang
(74) *Attorney, Agent, or Firm* — ALG Intellectual Property, LLC

(57) ABSTRACT

A computer-implemented method may include (1) identifying a plurality of specific categories of sensitive information to be protected by a DLP system, (2) obtaining a training data set for each specific category of sensitive information that includes a plurality of positive and a plurality of negative examples of the specific category of sensitive information, (3) using machine learning to train, based on an analysis of the training data sets, at least one machine learning-based classifier that is capable of detecting items of data that contain one or more of the plurality of specific categories of sensitive information, and then (4) deploying the machine learning-based classifier within the DLP system to enable the DLP system to detect and protect items of data that contain one or more of the plurality of specific categories of sensitive information in accordance with at least one DLP policy of the DLP system.

20 Claims, 9 Drawing Sheets

SYSTEMS AND METHODS FOR GENERATING MACHINE LEARNING-BASED CLASSIFIERS FOR DETECTING SPECIFIC CATEGORIES OF SENSITIVE INFORMATION

BACKGROUND

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access, smart mobile devices, and portable storage devices may pose unique challenges for individuals and organizations concerned with preventing the loss and/or exposure of sensitive data. Individuals and organizations are therefore increasingly looking to data loss prevention ("DLP") solutions to protect their sensitive data.

Conventional DLP systems typically attempt to protect sensitive data through the use of describing and fingerprinting technologies. Describing technologies typically involve identifying matches to keywords, expressions, patterns, or file types, and by performing other signature-based detection techniques. Fingerprinting technologies, on other hand, typically involve identifying exact matches to whole or partial files. While potentially effective in protecting much of an organization's sensitive data, fingerprinting and describing technologies may fail to accurately identify new items of sensitive data (i.e., items of sensitive data that have not been encountered before) and/or modifications to existing items of sensitive data. Because of this, existing DLP systems may be unable to adequately monitor and protect various types of unstructured sensitive data and intellectual property, such as product formulas, source code, and sales and marketing reports.

In an attempt to more accurately detect and protect unstructured sensitive data, at least one provider of DLP software has explored using machine-learning techniques to identify sensitive data that is similar to, but not exactly the same as, known examples of sensitive data.

SUMMARY

As will be described in greater detail below, the systems and methods described herein may provide various improvements over existing machine learning-based techniques for identifying sensitive information. For example, the systems and methods described herein may enable DLP administrators to train machine learning-based classifiers that are capable of indicating whether an item of data contains one or more of a plurality of specific categories of sensitive information.

In one example, a computer-implemented method for generating machine learning-based classifiers for detecting specific categories of sensitive information may include (1) identifying a plurality of specific categories of sensitive information to be protected by a DLP system, (2) obtaining a training data set for each specific category of sensitive information that includes a plurality of positive examples of data that fall within the specific category of sensitive information and a plurality of negative examples of data that do not fall within the specific category of sensitive information, (3) using machine learning to train, based on an analysis of the training data sets, at least one machine learning-based classifier that is configured to detect items of data that contain one or more of the plurality of specific categories of sensitive information, and then (4) deploying the machine learning-based classifier within the DLP system to enable the DLP system to detect and protect items of data that contain one or more of the plurality of specific categories of sensitive information in accordance with at least one DLP policy of the DLP system.

In one embodiment, using machine learning to train the machine learning-based classifier may include, for each training data set, (1) extracting a feature set from the training data set that includes statistically significant features of the positive examples within the training data set and statistically significant features of the negative examples within the training data set and then (2) building a machine learning-based classification model from the feature set that is capable of indicating whether or not items of data contain the specific category of sensitive information associated with the training data set. In some embodiments, the negative examples within a particular training data set may represent the positive examples from all other training data sets.

In one example, the machine learning-based classifier may be configured to detect items of data that contain more than one of the plurality of specific categories of sensitive information. In this example, the machine learning-based classifier may be configured to identify the specific categories of sensitive information that the item of data contains. In addition, for each specific category of sensitive information that the item of data contains, the machine learning-based classifier may be configured to identify the specific percentage of the item of data that is made up of that specific category of sensitive information and/or the specific portion of the item of data that contains that specific category of sensitive information.

In some examples, the DLP policy may specify at least one DLP action to be performed upon detecting an item of data that contains one or more of the plurality of specific categories of sensitive information. In some embodiments, the DLP action may be selected based at least in part on whether the item of data is made up of more or less than a specific percentage of one or more of the plurality of specific categories of sensitive information.

Examples of DLP actions that the DLP policy may specify include, for each specific category of sensitive information contained within an item of data, (1) restricting access to the item of data to entities that are authorized to access the specific category of sensitive information, (2) restricting access to the portion of the item of data that contains the specific category of sensitive information to entities that are authorized to access the specific category of sensitive information, and/or (3) automatically appending a custom disclaimer to the item of data that applies to the category of sensitive information. In one example, restricting access to the portion of the item of data that contains the specific category of sensitive information to entities that are authorized to access the specific category of sensitive information may include, prior to allowing an entity to access the item of data, redacting portions from the item of data that contain specific categories of sensitive information that the entity is not authorized to access.

In some embodiments, deploying the machine learning-based classifier within the DLP system may include providing the machine learning-based classifier as part of the DLP policy to a DLP agent installed on at least one client device and/or a DLP engine installed on at least one server configured to monitor a plurality of client devices. The computer-implemented method may also include, upon deploying the machine learning-based classifier within the DLP system, (1)

identifying an attempt to access at least one item of data via a data-loss vector, (2) determining, using a machine learning-based classifier, that the item of data contains one or more specific categories of sensitive information, and then (3) protecting at least a portion of the item of data in accordance with a DLP policy of the DLP system.

In one embodiment, a system for generating machine learning-based classifiers for use in detecting specific categories of sensitive information may include an identification module programmed to identify a plurality of specific categories of sensitive information to be protected by a DLP system. This system may also include a training module programmed to obtain a training data set for each specific category of sensitive information that includes a plurality of positive examples of data that fall within the specific category of sensitive information and a plurality of negative examples of data that do not fall within the specific category of sensitive information. The training module may also be programmed to use machine learning to train, based on an analysis of the training data sets, at least one machine learning-based classifier that is configured to detect items of data that contain one or more of the plurality of specific categories of sensitive information.

The system may also include a deployment module programmed to deploy the machine learning-based classifier within the DLP system to enable the DLP system to detect and protect items of data that contain one or more of the plurality of specific categories of sensitive information in accordance with at least one DLP policy of the DLP system. In addition, the system may include at least one processor configured to execute the identification module, the training module, and/or the deployment module.

In another example, a computer-readable-storage medium may include one or more computer-executable instructions that, when executed by at least one processor of a computing device, cause the computing device to (1) identify a plurality of specific categories of sensitive information to be protected by a DLP system, (2) obtain a training data set for each specific category of sensitive information that includes a plurality of positive examples of data that fall within the specific category of sensitive information and a plurality of negative examples of data that do not fall within the specific category of sensitive information, (3) use machine learning to train, based on an analysis of the training data sets, at least one machine learning-based classifier that is configured to detect items of data that contain one or more of the plurality of specific categories of sensitive information, and then (4) deploy the machine learning-based classifier within the DLP system to enable the DLP system to detect and protect items of data that contain one or more of the plurality of specific categories of sensitive information in accordance with at least one DLP policy of the DLP system.

As will be explained in greater detail below, the systems and methods described herein may enable an DLP administrator to use machine learning (e.g., vector machine learning) to train classifiers that are capable of detecting a plurality of specific and distinct categories of sensitive information. In addition, by training such classifiers using training data sets customized for each specific category of sensitive information that the DLP administrator desires to protect, these classifiers may be able to identify the specific categories of sensitive information that an item of data contains, the percentage of the item of data that is made up of each specific category of sensitive information that the item of data contains, and/or the specific portion(s) of the item of data that contain such sensitive information, among other details. The level of detail provided by such classifiers may also enable the DLP administrator to create complex DLP policies that specify custom DLP actions to be performed upon detecting items of data that satisfy the various characteristics identified by such classifiers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
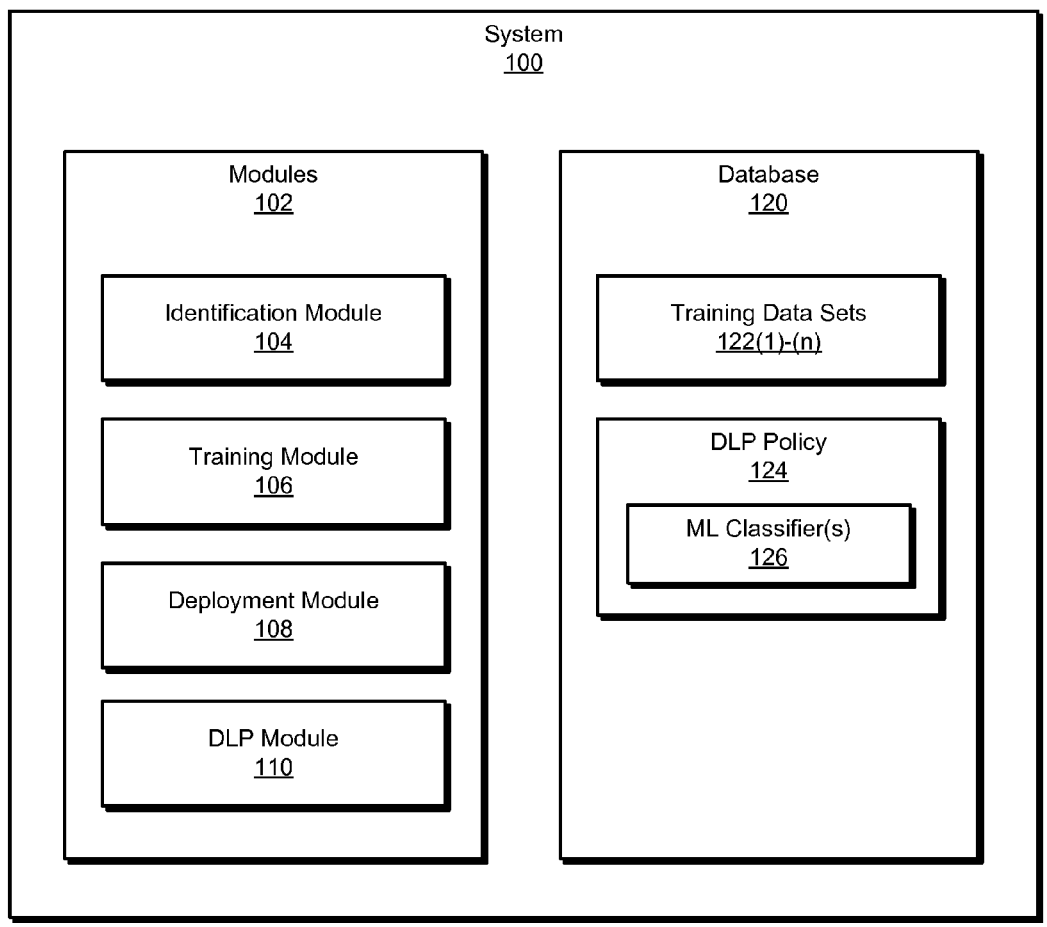
FIG. 1 is a block diagram of an exemplary system for generating machine learning-based classifiers for detecting specific categories of sensitive information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
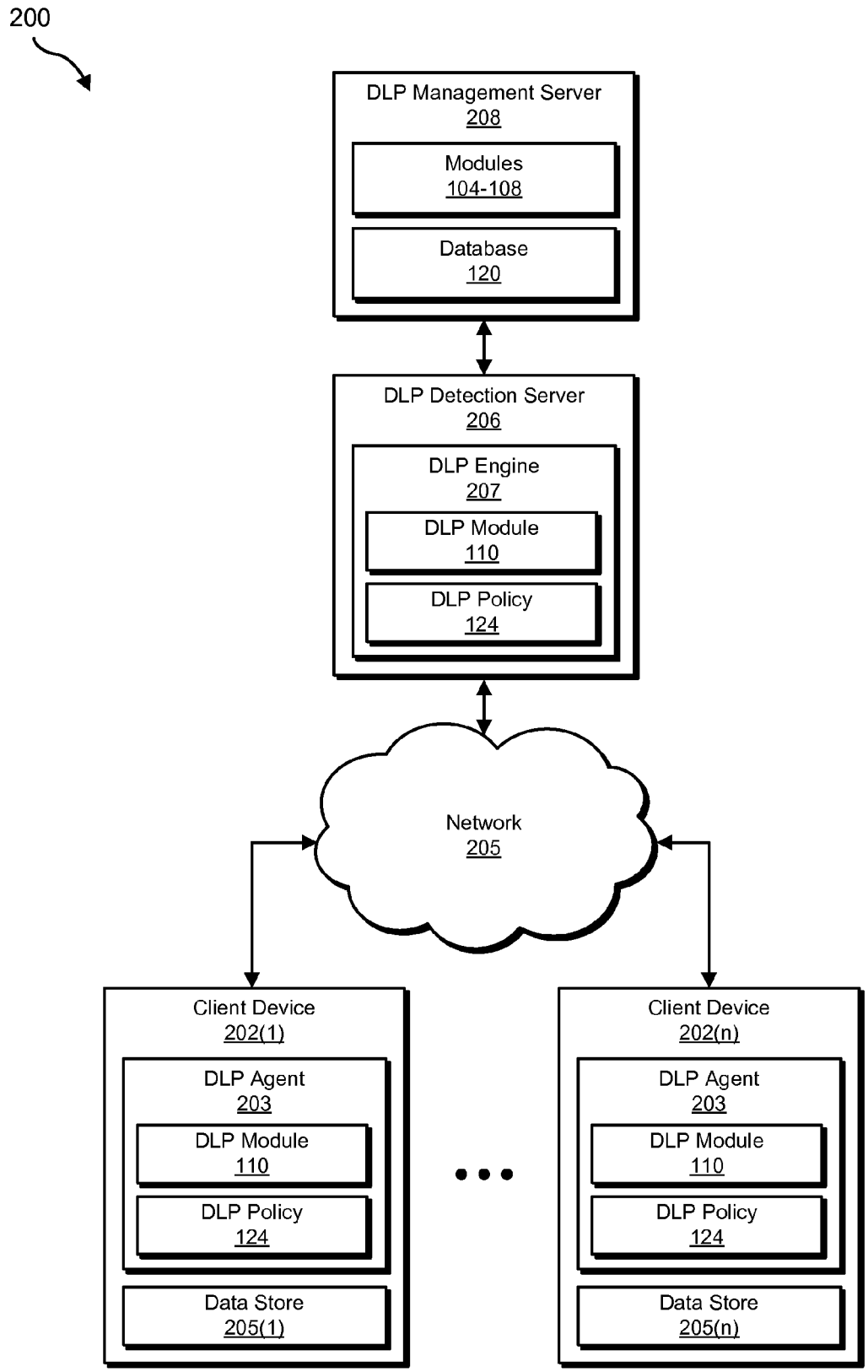
FIG. 2 is a block diagram of an exemplary system for generating machine learning-based classifiers for detecting specific categories of sensitive information.

The following will provide, with reference to FIGS. 1-2, detailed descriptions of exemplary systems for generating and using machine learning-based classifies to detect and protect specific categories of sensitive information. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for generating machine learning-based classifiers for detecting specific categories of sensitive information. As illustrated in this figure, exemplary system 100 may include one or more modules 102 for performing one or more tasks. For example, and as will be explained in greater detail below, exemplary system 100 may include an identification module 104 programmed to identify a plurality of specific categories of sensitive information that are to be protected by a DLP system. Exemplary system 100 may also include a training module 106 programmed to obtain a training data set for each specific category of sensitive information that includes a plurality of positive and negative examples of the specific category of sensitive information. Training module 106 may also be programmed to use machine learning to train, based on an analysis of the training data sets, at least one machine learning-based classifier that is capable of detecting items of data that contain one or more of the plurality of specific categories of sensitive information.

Exemplary system 100 may also include a deployment module 108 programmed to deploy the machine learning-based classifier within the DLP system to enable the DLP system to detect and protect items of data that contain one or more of the plurality of specific categories of sensitive information in accordance with at least one DLP policy of the DLP system. In addition, exemplary system 100 may include a DLP module 110 programmed to use the deployed machine learning-based classifier to detect items of data that contain one or more of the specific categories of sensitive information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client devices 202(1)-(n), DLP detection server 206, and/or DLP management server 208), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a plurality of training data sets 122(1)-(n) that each include a plurality of positive and a plurality of negative examples of a specific category of sensitive information, as will be described in detail below. Database 120 may also include one or more DLP policies 124 containing one or more machine learning-based classifiers 126, among other items, as will be described below.

Database 120 may represent portions of a single database or computing device or a plurality of databases or computing devices. For example, database 120 may represent a portion of DLP management server 208 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as DLP management server 208 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary DLP system 200 in FIG. 2. As shown in FIG. 2, DLP system 200 may include a plurality of client devices 202(1)-(n) in communication with a DLP detection server 206 and/or a DLP management server 208 via a network 205.

In one embodiment, one or more of modules 102 from FIG. 1 may, when executed by at least one processor of DLP management server 208, enable DLP management server 208 to generate machine learning-based classifiers that are capable of detecting items of data that contain one or more specific categories of sensitive information. For example, and as will be described in greater detail below, one or more of modules 102 may cause DLP management server 208 to (1) identify a plurality of specific categories of sensitive information that are to be protected within DLP system 200, (2) obtain a training data set for each specific category of sensitive information (e.g., training data sets 122(1)-(n)), each of which includes a plurality of positive and a plurality of negative examples of a specific category of sensitive information that is to be protected, (3) use machine learning to train, based on an analysis of training data sets 122(1)-(n), at least one machine learning-based classifier 126 that is capable of detecting items of data that contain one or more of the plurality of specific categories of sensitive information, and then (4) deploy machine learning-based classifier 126 within DLP system 200 to enable DLP system 200 to detect and protect items of data that contain one or more of the plurality of specific categories of sensitive information in accordance with a DLP policy 124 of DLP system 200.

Client devices 202(1)-(n) generally represent any type or form of computing device capable of reading computer-executable instructions. Examples of client devices 202(1)-(n) include, without limitation, laptops, desktops, servers, networking devices (e.g., network switches, routers, repeaters, proxies, gateways, modems, access points, etc.), cellular phones, personal digital assistants (PDAs), multimedia players, embedded systems, combinations of one or more of the same, exemplary computing system 810 in FIG. 8, or any other suitable computing device. In one example, a DLP agent 203 installed on each of client devices 202(1)-(n) may include a DLP module 110 capable of detecting and protecting items of data that contain specific categories of sensitive information in accordance with a DLP policy 124 deployed by DLP management server 208. In addition, in some embodiments client devices 202(1)-(n) may include one or more of the remainder of modules 102 from FIG. 1 (e.g., identification module 104, training module 106, and/or deployment module 108).

DLP detection server 206 generally represents any type or form of computing device that is capable of detecting potential DLP violations. In one example, DLP detection server 206 may monitor clients devices for potential DLP violations. For example, DLP agent 203 on one or more of client devices 122(1)-(n) may send an item of data to DLP detection server 206 for analysis. In this example, a DLP engine 207 on DLP detection server 206 may determine whether the item of data contains one or more specific categories of sensitive information. Once DLP engine 207 determines whether the item of data contains one or more specific categories of sensitive information, DLP engine 207 may transmit a message to DLP agent 203 that indicates whether the item of data contains one or more specific categories of sensitive information. In one embodiment, DLP detection server 206 may act as an aggregator of violations of DLP policies (e.g., as an aggregator of incident reports). In this embodiment, DLP detection server 206 may collect such data from each of client devices 202(1)-(n) and report the collected data to DLP management server 208 for analysis.

In another embodiment, DLP detection server 206 may be configured to detect potential DLP violations using various network and/or discovery-based DLP techniques. For example, DLP engine 207 on DLP detection server 206 may be configured to scan file systems, databases, and/or other data repositories within DLP system 200 in order to identify (using, e.g., one or more of the machine learning-based classifiers described in greater detail below) the presence of one or more specific categories of sensitive information.

DLP management server 208 generally represents any type or form of computing device that is capable of managing DLP policies. In one example, DLP management server 208 may generate and/or modify DLP policies (e.g., based on administrator input). DLP management server 208 may then propagate such DLP policies to DLP detection server 206 and/or client devices 202(1)-(n). Although illustrated as separate devices, in one example the functions and/or services performed by DLP management server 208 and DLP detection server 206 may be combined into a single device.

Network 205 generally represents any medium or architecture capable of facilitating communication or data transfer. Examples of network 205 include, without limitation, an intranet, a wide area network (WAN), a local area network (LAN), a personal area network (PAN), the Internet, power line communications (PLC), a cellular network (e.g., a GSM Network), exemplary network architecture 900 in FIG. 9, or the like. Network 205 may facilitate communication or data transfer using wireless or wired connections.

Figure 3:
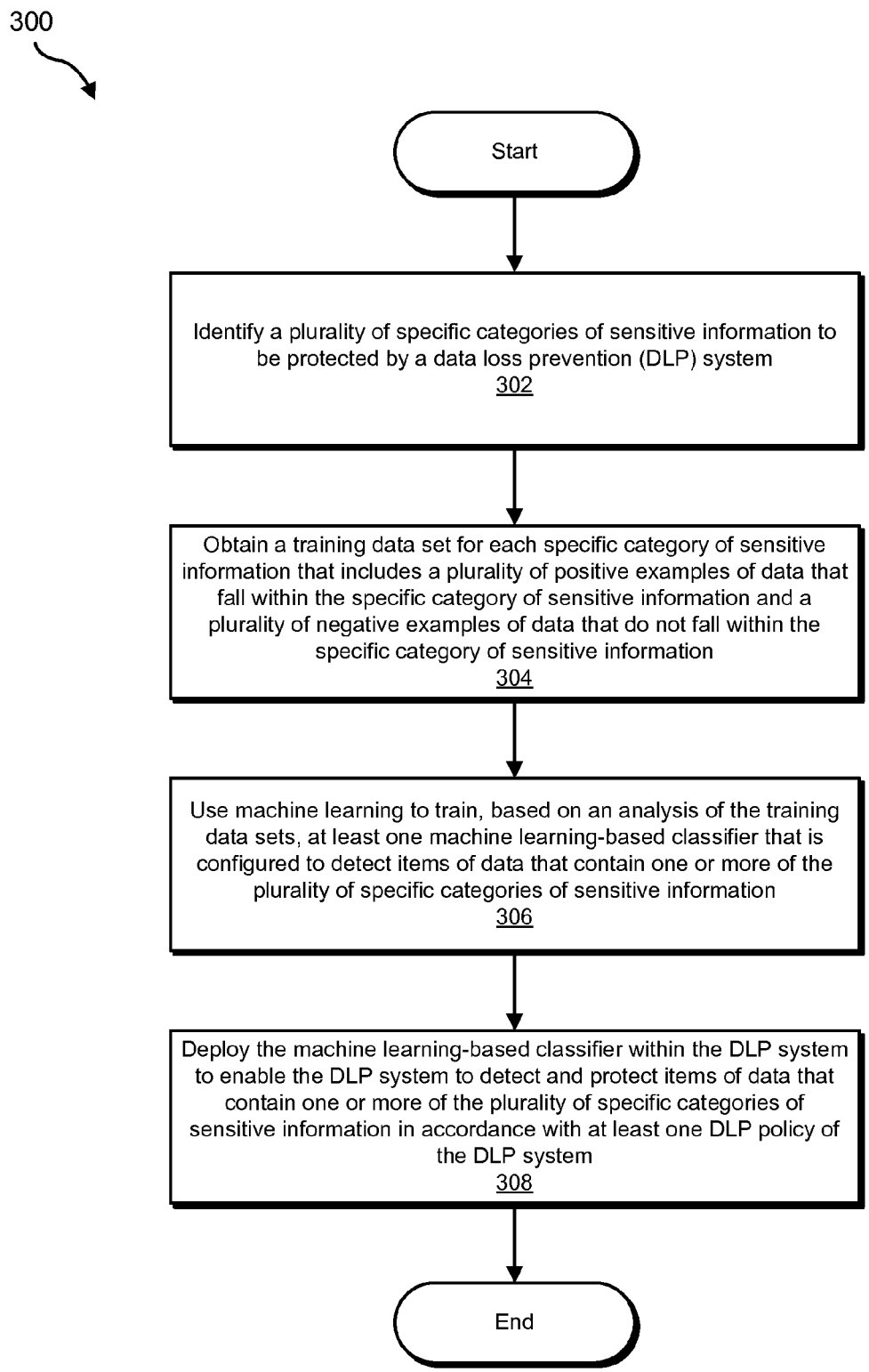
FIG. 3 is a flow diagram of an exemplary method for generating machine learning-based classifiers for detecting specific categories of sensitive information.

FIG. 3 is a flow diagram of an exemplary computer-implemented method 300 for generating machine learning-based classifiers for detecting specific categories of sensitive information. The steps shown in FIG. 3 may be performed by any suitable computer-executable code and/or computing system. In some embodiments, the steps shown in FIG. 3 may be performed by one or more of the components of system 100 in FIG. 1, DLP system 200 in FIG. 2, computing system 810 in FIG. 8, and/or portions of exemplary network architecture 900 in FIG. 9.

As illustrated in FIG. 3, at step 302 the systems described herein may identify a plurality of specific categories of sensitive information that are to be protected by a DLP system. For example, identification module 104 may, as part of DLP management server 208 in FIG. 2, identify a plurality of specific categories of sensitive information that are to be protected by DLP system 200.

The term "sensitive information," as used herein, may refer to information that, if revealed or disclosed to untrusted individuals or entities, may result in the loss of an advantage or level of security. As will be explained in greater detail below, examples of sensitive information may include, without limitation, personal information (e.g., information about a private individual, such as an individual's name, age, gender, and contact information), private information (e.g., information associated with a private individual that, if disclosed, may harm the individual's interests, such as an individual's Social Security number, credit card number, or health history), confidential business information (e.g., trade secrets or other intellectual property, sales and marketing plans, legal documents, pricing information, and financial data), or any other information that an individual or organization may wish to protect or keep private.

Similarly, the term "category of sensitive information," as used herein, may refer to a specific administrator or machine-defined division or classification of sensitive information. Examples of categories of sensitive information include, without limitation, sensitive legal information (e.g., license agreements, sales agreements, partnership agreements, etc.), sensitive financial information (sales reports, loan applications, etc.), sensitive marketing information (e.g., marketing plans, product launch timelines, etc.), sensitive technical information (e.g., proprietary source code, product documentation, product formulas, training models, actuary algorithms, etc.), sensitive human-resource information (e.g., insurance claims, billing codes and/or procedures, patient health information, and personal information, such as Social Security numbers, credit card numbers, personal addresses, and resumes), or the like.

The systems described herein may perform step 302 in a variety of ways. In one example, the systems described herein may identify a plurality of administrator-defined categories of sensitive information that are to be protected by a DLP system. For example, identification module 104 may, as part of DLP management server 208 in FIG. 2, enable an administrator of DLP system 200 to specify or identify (via, e.g., a user interface) a plurality of specific categories of sensitive information that are to be protected by DLP system 200.

Returning to FIG. 3, at step 304 the systems described herein may obtain a training data set for each specific category of sensitive information identified in step 302. For example, training module 106 may, as part of DLP management server 208 in FIG. 2, obtain a training data set for each specific category of sensitive information identified in step 302 (e.g., training data sets 122(1)-(n)).

In one example, each training data set obtained in step 304 may include both a plurality of positive examples of data that fall within a specific category of sensitive information and a plurality of negative examples of data that do not fall within the specific category of sensitive information. For example, each of training data sets 122(1)-(n) in FIG. 4 may be associated with a specific (and unique) category of sensitive information, such as sensitive legal information, sensitive financial information, or the like. In this example, each training data set may contain positive and negative examples of its respective category of sensitive information. For example, training data set 122(1) may contain positive and negative examples of sensitive financial information, while training data set 122(n) may contain positive and negative examples of sensitive legal information.

In one example, each positive example included within a training data set may consist entirely of information that falls within the specific category of sensitive information associated with the training data set. For example, if a training data set contains positive and negative examples of sensitive legal information, then 100% of the information contained within each positive example within the training data set may represent sensitive legal information.

In contrast, each negative example included within a training data set may consist entirely of information that does not fall within the specific category of sensitive information associated with the training data set. For example, if a training data set contains positive and negative examples of sensitive legal information, then 0% of the information contained within each negative example within the training data set may represent sensitive legal information.

In one embodiment, each negative example within a training data set may consist entirely of non-sensitive information. In another example, each negative example within a training data set may consist entirely of sensitive information that falls within other categories of sensitive information (i.e., sensitive information that does not fall within the specific category of sensitive information associated with the training data set in question).

In one example, the negative examples within a training data set may be made up of the positive examples from all other training data sets. For example, the negative examples included within training data set 122(1) may be made up of the positive examples from all other training data sets illustrated in FIG. 4 (e.g., the positive examples of training data sets 122(2)-(n)). In this example, the negative examples within training data set 122(1) need not be explicitly obtained since the positive examples from all other training data sets (e.g., training data sets 122(2)-(n)) form the negative examples within training data set 122(1).

The systems described herein may perform step 304 in a variety of ways and contexts. In some examples, the systems described herein may obtain a training data set for each of the plurality of specific categories of sensitive information identified in step 302 from an administrator or an existing DLP system. For example, training module 106 may, as part of DLP management server 208 in FIG. 2, provide a user interface that enables an administrator of DLP system 200 to input a training data set for each specific category of sensitive information that the administrator desires to protect. In one example, this administrator may represent an administrator responsible for creating and/or deploying DLP policies for end users within an enterprise. In another example, this administrator may represent a DLP-software provider. In this example, the DLP-software provider may provide training data sets for pre-defined categories of sensitive information that the DLP-software provider anticipates will be useful for compliance purposes within enterprise and/or end-user environments.

Returning to FIG. 3, at step 306 the systems described herein may use machine learning to train, based on an analysis of the training data sets obtained in step 304, at least one machine learning-based classifier that is capable of detecting items of data that contain one or more specific categories of sensitive information. For example, training module 106 may, as part of DLP management server 208 in FIG. 2, use machine learning (e.g., vector machine learning) to train, based on an analysis of training data sets 122(1)-(n) in FIG. 4, a machine learning-based classifier 126 that is capable of detecting items of data that contain one or more of the plurality of specific categories of sensitive information identified in step 302.

The systems described herein may perform step 306 in a variety of ways and contexts. In one example, the systems described herein may train the machine learning-based classifier by, for each training data set obtained in step 304, (1) extracting a feature set from the training data set that includes statistically significant features of the positive examples within the training data set and statistically significant features of the negative examples within the training data set and then (2) using the feature set to build a machine learning-based classification model that is capable of indicating whether or not new items of data contain information that falls within the specific category of sensitive information associated with the training data set.

The term "feature," as used herein, may refer to any characteristic of an item of data that may be used to determine whether the item of data falls within one or more specific categories of sensitive information. Examples of such features include, without limitation, a word (e.g., "proprietary"), a pair of words (e.g., "stock market"), a phrase (e.g., "please do not distribute"), etc.

The systems described herein may extract a feature set from a training data set in a variety of ways. In some examples, a weight may be associated with each extracted feature in order to indicate the relative importance of that feature relative to other features. For example, training module 106 may (1) determine the frequency of occurrence of various features (e.g., words) within both the positive and negative examples within a training data set, (2) rank these positive features and negative features based on, for example, frequency of occurrence, and then (3) select the highest ranked features for inclusion within a feature set. In this example, the weight associated with each feature may be the frequency of occurrence of the specific feature. In some examples, training module 106 may also filter out commonly used words during this process, such as "the," "it," "and," "or," etc.

In some examples, training module 106 may use a term frequency-inverse document frequency (TF-IDF) algorithm to select, and/or weight features within, the feature set. Training module 106 may also use other feature-extraction and/or feature-weighting algorithms, such as segment-set term frequency-inverse segment-set frequency (STF-ISSF), segment-set term frequency-inverse document frequency (STF-IDF), Kullback-Leibler divergence (i.e., information gain), etc. In addition, training module 106 may perform feature extraction multiple times, each time using a different feature-extraction algorithm. The feature sets generated using the different algorithms may each be used to generate different machine learning-based classification models. In this example, the feature set with the highest quality metrics may be saved and the others may be discarded. In one embodiment, an administrator of DLP system 200 may specify the feature-selection algorithm to be used by training module 106.

As detailed above, after training module 106 has generated a feature set for a particular training data set, training module 106 may generate a machine learning-based classification model based on the feature set. The term "machine learning-based classification model," as used herein, may refer to a complex mathematical model for data classification that is generated using machine-learning techniques. In one example, this machine learning-based classifier may include a map of support vectors that represent boundary features. In this example, these boundary features may be selected from, and/or represent the highest-ranked features in, a feature set.

Figure 4:
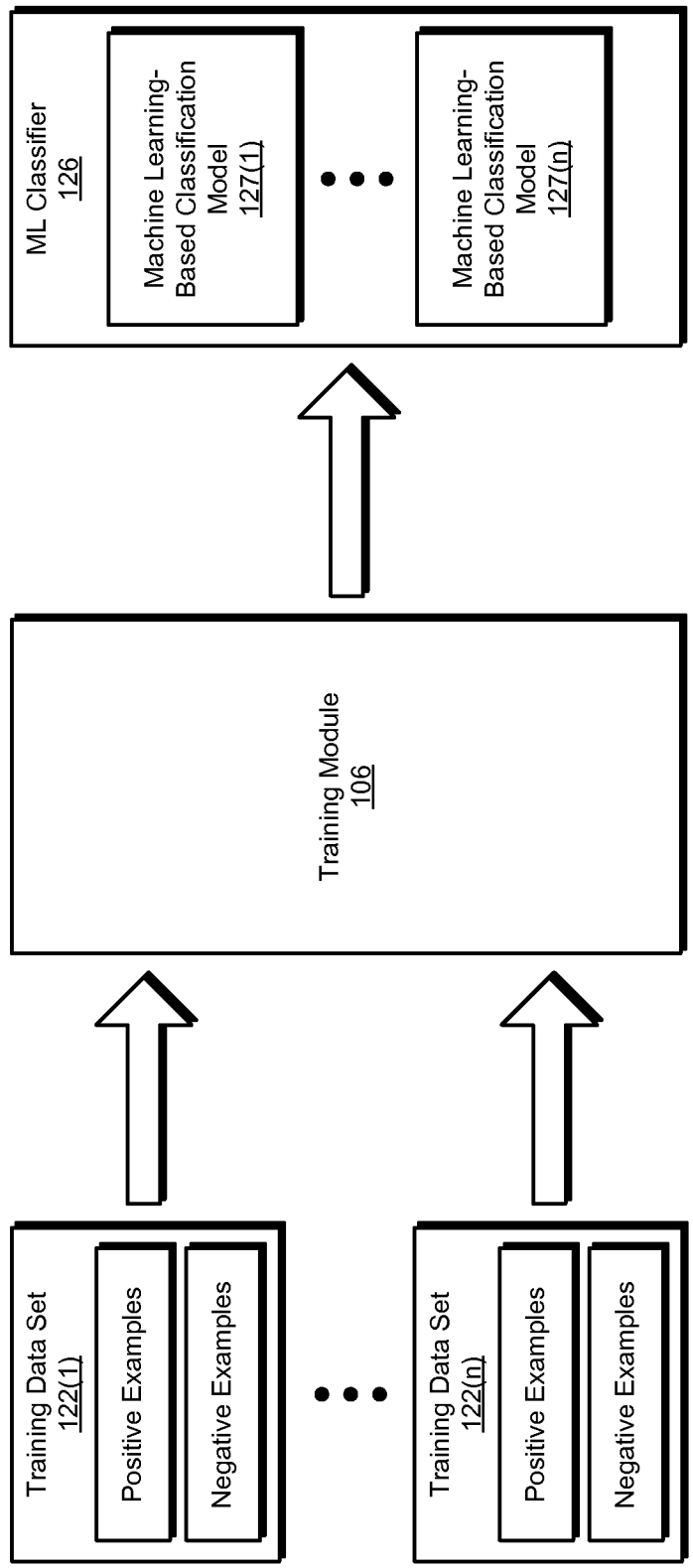
FIG. 4 is an illustration of an exemplary process flow for creating machine learning-based classifiers for detecting specific categories of sensitive information.

As illustrated in FIG. 4, training module 106 may use the feature sets extracted from training data sets 122(1)-(n) to build a machine learning-based classification model (e.g., machine learning-based classification models 127(1)-(n)) for each of the specific categories of sensitive information identified in step 302. In some examples, machine learning-based classification models 127(1)-(n) may be combined into a single machine learning-based classification model. Similarly, machine learning-based classifier 126 may represent a single classifier containing a single or a plurality of machine learning-based classification models and/or multiple classifiers containing a single or a plurality of machine learning-based classification models. In addition, in some examples machine learning-based classifier 126 may also include each of training data sets 122(1)-(n) and/or each feature set extracted from training data sets 122(1)-(n).

In some examples, the machine learning-based classifier trained in step 306 may be able to detect items of data that contain multiple categories of sensitive information. For example, because machine learning-based classifier 126 contains machine learning-based classification models for each of a plurality of specific categories of sensitive information, machine learning-based classifier 126 may be able to identify items of data that contain more than one category of sensitive information (e.g., such as a document that contains both sensitive legal information and sensitive financial information).

In some examples, if an item of data contains multiple categories of sensitive information, machine learning-based classifier 126 may also be able to identify the specific categories of sensitive information that the item of data contains. For example, machine learning-based classifier 126 may be able to indicate that a document contains both sensitive legal information and sensitive financial information.

Machine learning-based classifier 126 may also be able to identify, for each specific category of sensitive information that an item of data contains, the percentage of the item of data that is made up of that specific category of sensitive information. For example, machine learning-based classifier 126 may, through the use of machine learning-based classification models 127(1)-(n), determine that 50% of a particular document represents sensitive legal information, 25% of the document represents sensitive financial information, and the remaining 25% of the document represents sensitive human-resource information.

Machine learning-based classifier 126 may also be able to identify, for each specific category of sensitive information that an item of data contains, the specific portion of the item of data that contains that specific category of sensitive information. For example, machine learning-based classifier 126 may, through the use of machine learning-based classification models 127(1)-(n), determine that the first three paragraphs of a particular document contain sensitive legal information, the fourth through eighth paragraphs of the document contain sensitive financial information, and the ninth and tenth paragraphs of the document contain sensitive human-resource information. One or more of these specific portions may then be redacted in accordance with the DLP policies defined by a DLP administrator, as will be described in greater detail below in connection with FIG. 5.

Returning to FIG. 3, at step 308 the systems described herein may deploy the machine learning-based classifier within the DLP system to enable the DLP system to detect and protect (in accordance with at least one DLP policy of the DLP system) items of data that contain one or more of the plurality of specific categories of sensitive information identified in step 302.

The systems described herein may perform step 308 in a variety of ways. In one example, the systems described herein may perform step 308 by providing the machine learning-based classifier trained in step 306 as part of a DLP policy to a DLP agent installed on at least one client device. For example, deployment module 108 may, as part of DLP management server 208 in FIG. 2, deploy machine learning-based classifier 126 as part of DLP policy 124 to DLP agent 203 installed on each of client devices 202(1)-(n). In some examples, DLP policy 124 and/or machine learning-based classifier 126 may represent an administrator-modified and/or updated policy and/or module. In this example, machine learning-based classifier 126 may enable DLP agent 203 to detect and protect (in accordance with DLP policy 124) data encountered by client devices 202(1)-(n) that contain the specific categories of sensitive information identified in step 302.

In another example of step 308, the systems described herein may provide the machine learning-based classifier trained in step 306 as part of a DLP policy to a DLP engine installed on at least one server configured to monitor a plurality of client devices. For example, deployment module 108 may, as part of DLP management server 208, deploy machine learning-based classifier 126 as part of DLP policy 124 to DLP engine 207 on DLP detection server 206. In some examples, DLP policy 124 and/or machine learning-based classifier 126 may represent an administrator-modified and/or updated policy and/or module. As with the prior example, machine learning-based classifier 126 may enable DLP engine 207 to detect and protect (in accordance with DLP policy 124) items of data encountered by client devices 202(1)-(n) (as monitored by DLP detection server 206) that contain the specific categories of sensitive information identified in step 302. Upon completion of step 308, exemplary method 300 in FIG. 3 may terminate.

Figure 5:
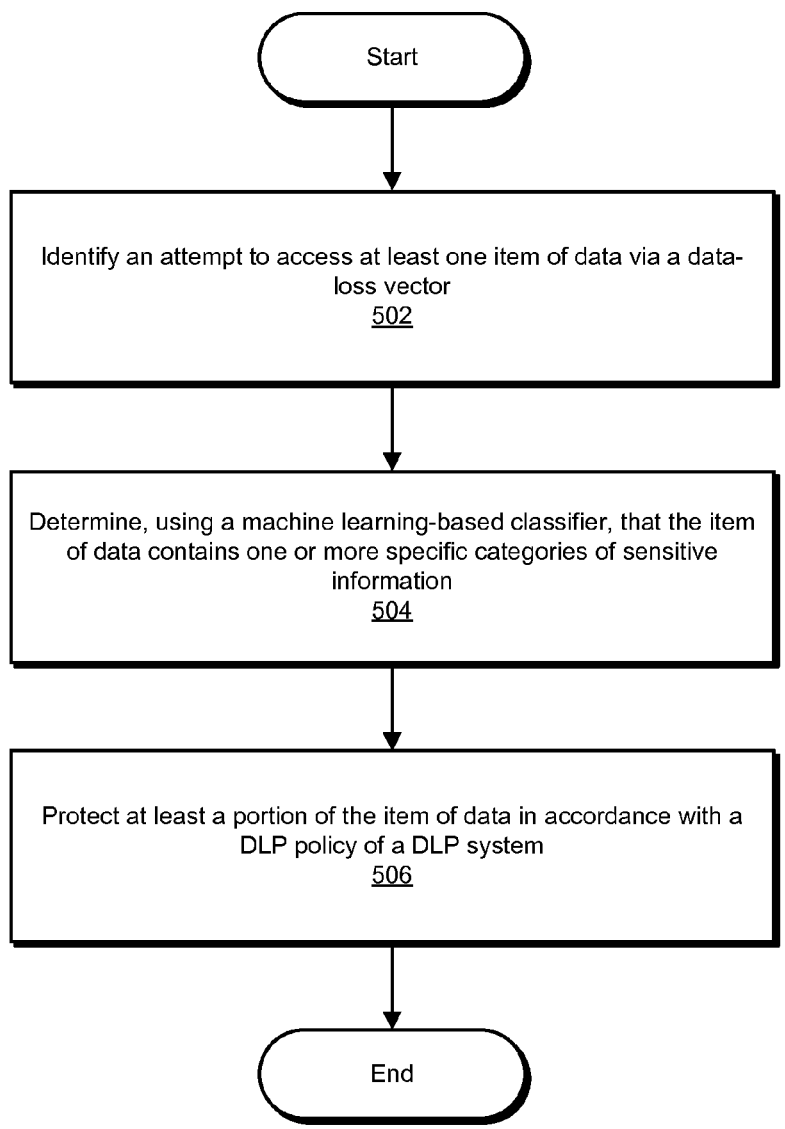
FIG. 5 is a flow diagram of an exemplary method for using machine learning-based classifiers to detect specific categories of sensitive information.

As detailed above, the machine learning-based classifier generated in accordance with the steps outlined in exemplary method 300 in FIG. 3 may be used by DLP systems to detect and protect items of data that contain one or more specific categories of sensitive information. FIG. 5 is a flow diagram of an exemplary computer-implemented method 500 for performing such a task. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 810 in FIG. 8, and/or portions of exemplary network architecture 900 in FIG. 9.

As illustrated in FIG. 5, at step 502 the systems described herein may identify an attempt to access at least one item of data via a data-loss vector. For example, DLP module 110 may, as part of DLP agent 203 on client devices 202(1)-(n) and/or DLP engine 207 on DLP detection server 206 in FIG. 2, identify an attempt by one or more of client devices 202(1)-(n) to access and/or transmit an item of data (such as a document) via a data-loss vector.

The term "data-loss vector," as used here, may refer to a path through which data can be transferred off of a device. Examples of data-loss vectors include, without limitation, burning files to an optical disc, copying data to a portable drive (such as a portable universal serial bus (USB) drive), copying data to a network share, printing data to a printer, sending data through a fax, transmitting data over a network using FTP, HTTP, or other communication protocols (e.g., sending an email, instant message, etc.), performing a print screen operation, etc. Similarly, the term "access," as used herein, may refer to any attempt to access, transmit, and/or manipulate data via a data-loss vector. Examples of ways in which data may be "accessed," as that term is used herein, include, without limitation, burning files to an optical disc, copying data to a portable drive (such as a USB drive), copying data to a network share, printing data to a printer, sending data through a fax, transmitting data over a network using FTP, HTTP, or other communication protocols (e.g., sending an email, instant message, etc.), performing a print screen operation, etc.

The systems described herein may perform step 502 in a variety of ways. In one example, DLP agent 203 and/or DLP engine 207 may monitor data-loss vectors associated with client devices 202(1)-(n) to ensure that sensitive information does not leave client devices 202(1)-(n), either accidentally or deliberately for illegitimate purposes. DLP agent 203 and/or DLP engine 207 may also scan data as it moves through a data-loss vector and/or when a request to send the data through a data-loss vector is received.

In some examples, the item of data identified in step 502 may represent a new item of data (i.e., data that has not yet been encountered by any of the devices within DLP system 200). This item of data may also represent unstructured textual data, such as a text document or source code.

Returning to FIG. 5, at step 504 the systems described herein may determine, using the machine learning-based classifier generated in step 302 of exemplary method 300 in FIG. 3, that the item of data identified in step 502 contains one or more specific categories of sensitive information. For example, DLP module 110 may, as part of DLP agent 203 and/or DLP engine 207 in FIG. 2, use the machine learning-based classifier 126 deployed as part of DLP policy 124 in step 308 in FIG. 3 to determine that the item of data identified at step 502 contains one or more of the specific categories of sensitive information identified in step 302 in FIG. 3.

The systems described herein may perform step 504 in a variety of ways. In one example, if DLP agent 203 and/or DLP engine 207 detects data moving through a data-loss vector or a request to move data through a data-loss vector, DLP agent 203 and/or DLP engine 207 may implement DLP policy 124 to determine whether the data contains one or more of the specific categories of sensitive data identified in step 302 of exemplary method 300 in FIG. 3. In some examples, and as detailed above, DLP policy 124 may specify data-loss vectors that are to be monitored, a type of content that is to be monitored (e.g., messages, displayed data, stored documents, etc.), how to identify sensitive data (e.g., through the use of one or more classifiers, such as machine learning-based classifier 126), and/or an action to be performed when sensitive data is detected.

As detailed above, DLP policy 124 may include one or more classifiers, such as machine learning-based classifier 126, for classifying data as sensitive or non-sensitive (among other details). Examples of the types of classifiers that may be included within DLP policy 124 include, without limitation, machine learning-based classifiers (such as machine learning-based classifier 126), described content matching (DCM) classifiers that define one or more key words and/or regular expressions to be searched for, and exact data matching (EDM) classifiers and indexed document matching (IDM) classifiers that identify sensitive information by generating a fingerprint (e.g., hash) of an item of data and then comparing the same to stored fingerprints of known sensitive items of data. In each case, by processing unclassified data using one or more of the classifiers specified within DLP policy 124, DLP agent 203 and/or DLP engine 207 may determine whether the item of data identified in step 502 contains one or more specific categories of sensitive information.

Figure 6:
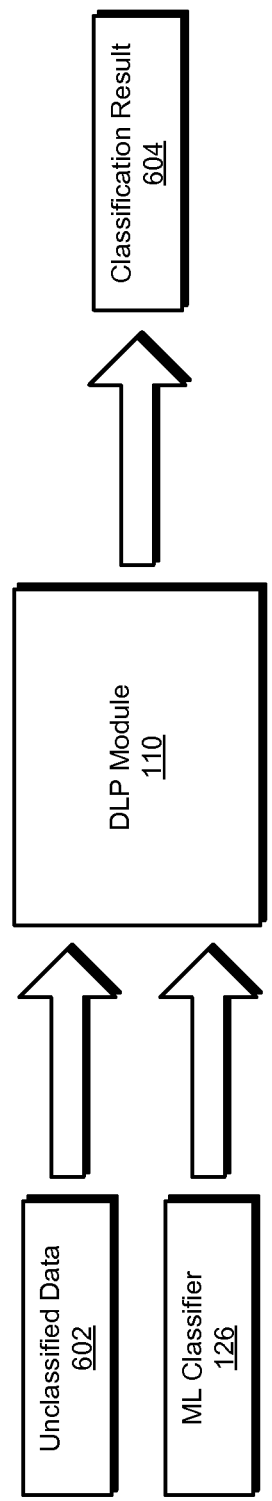
FIG. 6 is an illustration of an exemplary process flow for using machine learning-based classifiers to detect specific categories of sensitive information.

FIG. 6 is an illustration of an exemplary process flow for using a machine learning-based classifier to determine whether an item of data contains one or more specific categories of sensitive information. As illustrated in this figure, DLP module 110 may receive as input unclassified data 602 (which may, as detailed above, represent a new item of data that has not yet been encountered by any of the devices within DLP system 200) and machine learning-based classifier 126. In this example, DLP module 110 may process unclassified data 602 using machine learning-based classifier 126 to arrive at a classification result 604.

As detailed above, classification result 604 may identify a variety of characteristics of an item of data. For example, classification result 604 may identify the specific categories of sensitive information that the item of data contains (e.g., classification result 604 may indicate that a document contains both sensitive legal information and sensitive financial information). Classification result 604 may also identify, for each specific category of sensitive information that an item of data contains, the percentage of the item of data that is made up of that specific category of sensitive information. For example, classification result 604 may indicate that 50% of a particular document represents sensitive legal information, 25% of the document represents sensitive financial information, and the remaining 25% of the document represents sensitive human-resource information.

Classification result 604 may also identify, for each specific category of sensitive information that an item of data contains, the specific portion of the item of data that contains that specific category of sensitive information. For example, classification result 604 may indicate that the first three paragraphs of a particular document contain sensitive legal information, the fourth through eighth paragraphs of the document contain sensitive financial information, and the ninth and tenth paragraphs of the document contain sensitive human-resource information.

Returning to FIG. 5, at step 506 the systems described herein may, upon determining that the item of data contains one or more specific categories of sensitive information, protect all or a portion of the item of data in accordance with a DLP policy of the DLP system. For example, DLP agent 203 and/or DLP engine 207 in FIG. 2 may prevent the item of data from passing through the data-loss vector identified in step 502 in accordance with DLP policy 124. Upon completion of step 506, exemplary method 500 in FIG. 5 may terminate.

As detailed above, a DLP policy (such as DLP policy 124) may specify at least one DLP action to be performed upon detecting an item of data that contains one or more specific categories of sensitive information. Examples of the types of DLP actions that may be specified within a DLP policy include, without limitation, notifying a DLP administrator, preventing data from exiting a client device through a data-loss vector, locking down a client device so that data cannot be moved off of the client device through a data-loss vector, encrypting data as it is moved off of a client device, and the like. In some examples, DLP policies may be administrator defined.

In one example, a DLP action may be selected based at least in part on whether an item of data is made up of more or less than a specific percentage of one or more specific categories of sensitive information. For example, DLP policy 124 may specify that items of data that are made up of more than a specific percentage of information from a specific category of sensitive information must be reviewed or approved by an administrator or department head before allowing the item of data to exit the DLP system through a data-loss vector. For example, DLP policy 124 may specify that if more than 70% of a document contains sensitive legal information, then this document must be reviewed by the head of the legal department before the document can exit the DLP system through a data-loss vector.

Similarly, DLP policy 124 may specify that items of data that are made up of more than a specific percentage of a specific category of sensitive information (e.g., if more than 50% of a document represents sensitive financial information) must be prevented from exiting the DLP system through a data-loss vector. As another example, DLP policy 124 may specify that items of data that are made up of more than a specific percentage of a specific category of sensitive information (e.g., if more than 90% of a document represents sensitive human-resource information) must be encrypted before being allowed to exit the DLP system through a data-loss vector.

In some examples, DLP policy 124 may specify that access to an item of data is to be restricted to entities (e.g., devices, individuals, and/or organizations) that are authorized to access the specific category of sensitive information contained within the item of data. As detailed above, the term "access," as used herein, may refer to any attempt to access, transmit, and/or otherwise manipulate data via a data-loss vector. Examples of ways in which data may be "accessed," as that term is used herein, include, without limitation, burning files to an optical disc, copying data to a portable drive (such as a USB drive), copying data to a network share, printing data to a printer, sending data through a fax, transmitting data over a network using FTP, HTTP, or other communication protocols (e.g., sending an email, instant message, etc.), performing a print screen operation, etc.

For example, DLP policy 124 may specify that only members of the finance department within an organization may access an item of data that contains sensitive financial information. Similarly, DLP policy 124 may specify that, if an item of data contains more than one specific category of sensitive information, then an entity may only access this item of data if the entity in question is authorized to access each and every category of sensitive information contained within the item of data. For example, if an item of data contains both sensitive financial information and sensitive legal information, then DLP policy 124 may restrict access to this item of data to entities that are authorized to access both sensitive financial information and sensitive legal information.

In another example, if an item of data contains more than one specific category of sensitive information, then DLP policy 124 may specify that, for each specific category of sensitive information contained within the item of data, access to the portion of the item of data that contains the specific category of sensitive information in question is to be restricted to entities that are authorized to access this specific category of sensitive information. For example, DLP policy 124 may specify that, before an entity may be granted access to an item of data containing more than one category of sensitive information (such as document 700 in FIG. 7), DLP agent 203 and/or DLP engine 207 must redact specific categories of sensitive information from the item of data that the entity is not authorized to access.

Figure 7:
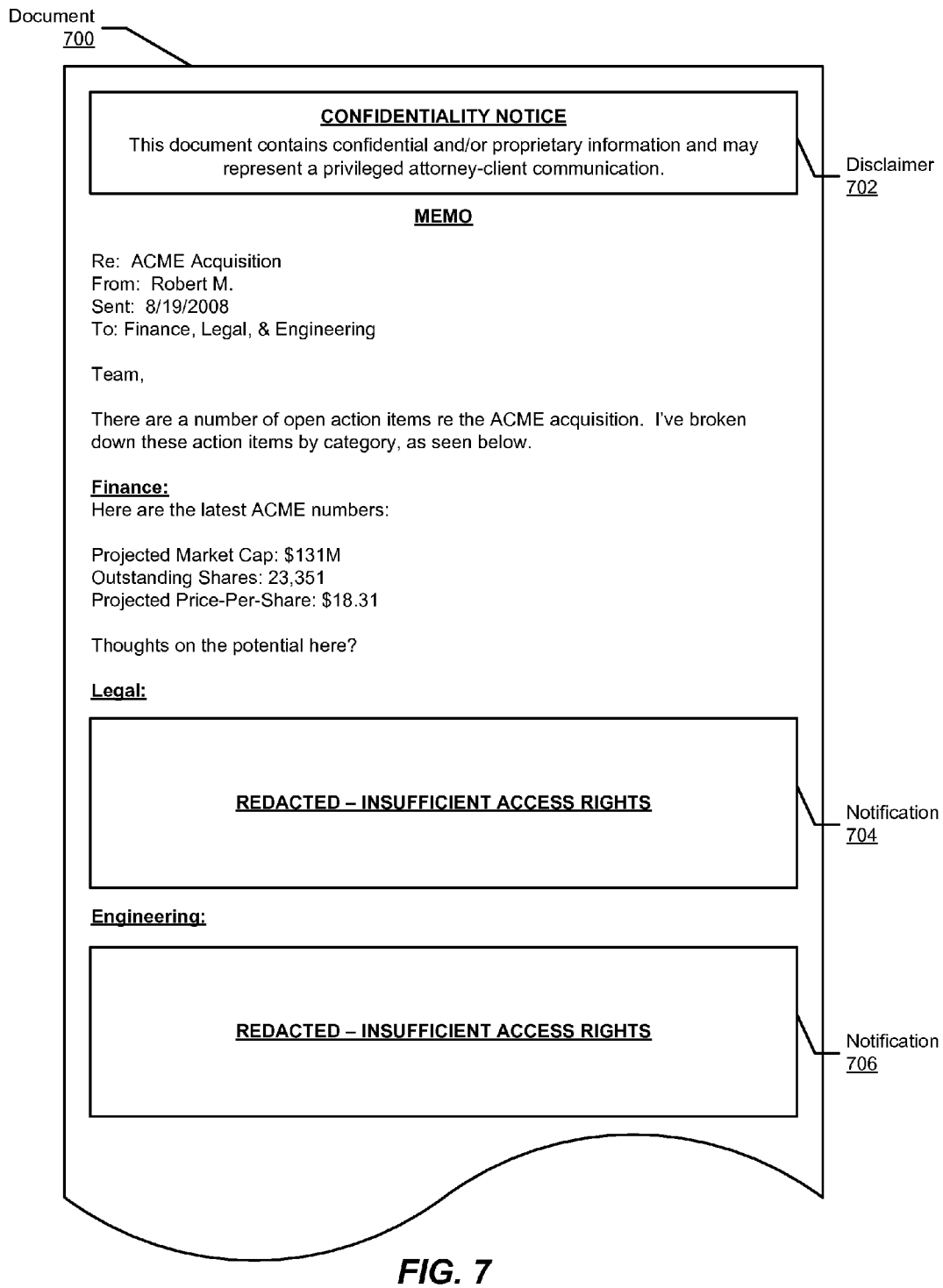
FIG. 7 is an illustration of an exemplary document from which specific categories of sensitive information may be redacted.

For example, DLP policy 124 may specify that the sensitive legal and engineering information contained within document 700 in FIG. 7 must be redacted prior to allowing an email containing this document to be transmitted to members of a financial department that are only authorized to access sensitive financial information (but not sensitive legal or engineering information). As illustrated in this figure, redacted information may be replaced with a notification (e.g., notifications 704 and 706) that indicate that an entity does not have sufficient access rights to view the sensitive information in question. Any of a variety of portions of an item of data or document may be redacted, including a document's file name, the title of a document, the body or content of a document, a timestamp associated with a document, the subject, body, recipient list, and/or attachment of an email, or the like.

In some examples, DLP policy 124 may also include rules for automatically appending a custom disclaimer to an item of data that applies to one or more of the categories of sensitive information contained within the item of data. For example, if an item of data contains sensitive financial information, then DLP policy 124 may specify that DLP agent 203 and/or DLP engine 207 must append a disclaimer (such as disclaimer 702 in FIG. 7) to the item of data that indicates that the item of data contains sensitive financial information. In some examples, if an item of data contains more than one specific category of sensitive information, then DLP policy 124 may specify that DLP agent 203 and/or DLP engine 207 must append a custom disclaimer to the item of data for each specific category of sensitive information contained within the item of data. For example, if an item of data contains sensitive financial and legal information, then DLP policy 124 may specify that DLP agent 203 and/or DLP engine 207 must append a disclaimer to the item of data that indicates that the item of data contains sensitive legal and financial information.

As detailed above, the systems and methods described herein may enable an DLP administrator to use machine learning (e.g., vector machine learning) to train classifiers that are capable of detecting a plurality of specific and distinct categories of sensitive information. In addition, by training such classifiers using training data sets customized for each specific category of sensitive information that the DLP administrator desires to protect, these classifiers may be able to identify the specific categories of sensitive information that an item of data contains, the percentage of the item of data that is made up of each specific category of sensitive information that the item of data contains, and/or the specific portion(s) of the item of data that contain such sensitive information, among other details. The level of detail provided by such classifiers may also enable the DLP administrator to create complex DLP policies that specify custom DLP actions to be performed upon detecting items of data that satisfy the various characteristics identified by such classifiers.

Figure 8:
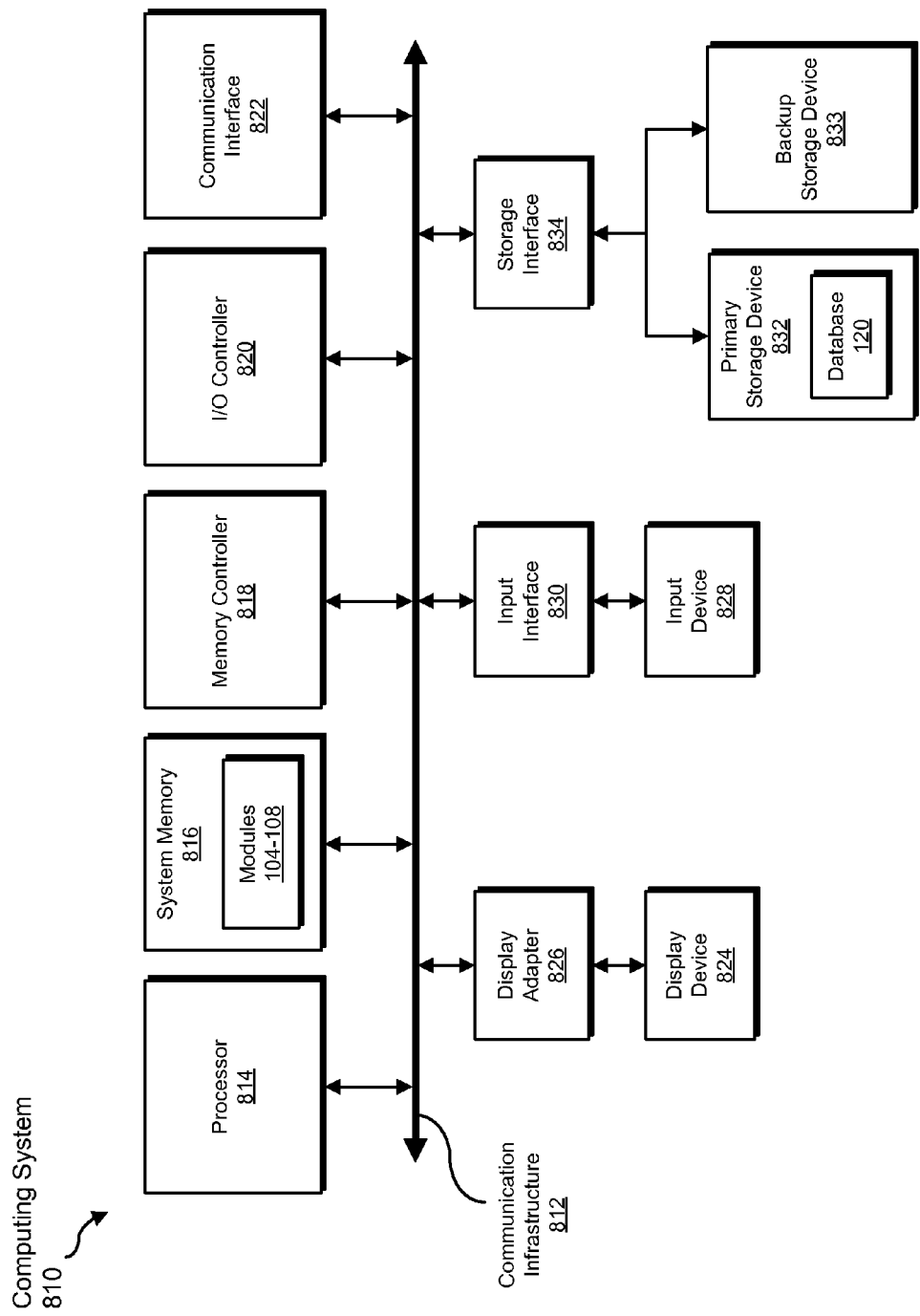
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, exemplary computing system 810 may perform and/or be a means for performing, either alone or in combination with other elements, one or more of the identifying, obtaining, using, training, deploying, extracting, building, detecting, restricting, appending, redacting, determining, and protecting steps described herein. Computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
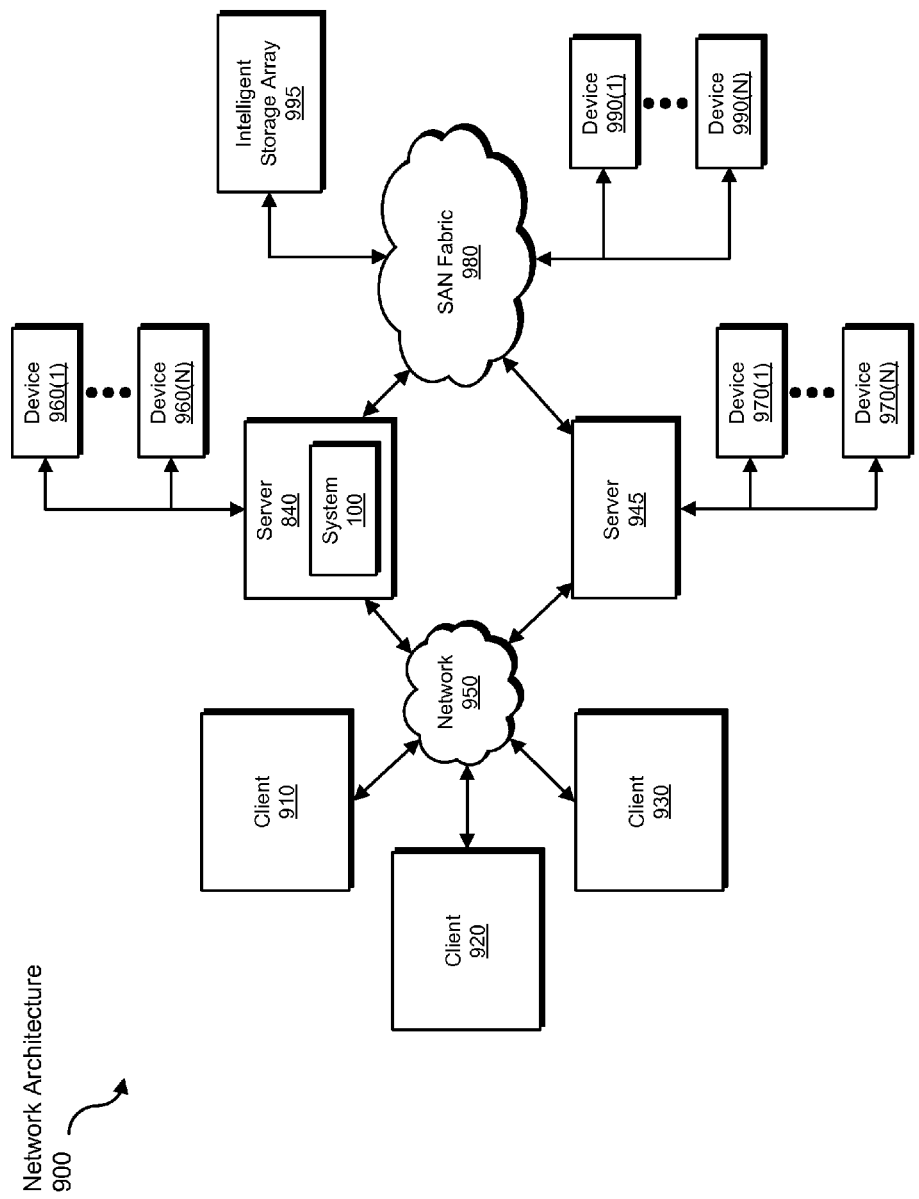
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the identifying, obtaining, using, training, deploying, extracting, building, detecting, restricting, appending, redacting, determining, and protecting steps disclosed herein. All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for generating machine learning-based classifiers for detecting specific categories of sensitive information. Computing system 810 and/or one or more components of network architecture 900 may also perform and/or be a means for performing, either alone or in combination with other elements, one or more steps of an exemplary method for using machine learning-based classifiers within a DLP system to detect specific categories of information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 from FIG. 1 may transform a computing system (such as DLP management server 208 in FIG. 2) into a device capable of generating machine learning-based classifiers that are capable of detecting specific categories of sensitive information.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for generating machine learning-based classifiers for detecting specific categories of sensitive information, at least a portion of the method being performed by a computing device comprising at least one processor, the method comprising:
    identifying a plurality of specific categories of sensitive information to be protected by a data loss prevention (DLP) system;
    obtaining a training data set customized for each specific category of sensitive information that comprises a plurality of positive examples of data that fall within the specific category of sensitive information and a plurality of negative examples of data that do not fall within the specific category of sensitive information;
    using machine learning to train, based on an analysis of the training data sets, at least one machine learning-based classifier to detect items of data that contain one or more of the plurality of specific categories of sensitive information;
    deploying the machine learning-based classifier within the DLP system to enable the DLP system to detect and protect, using the machine learning-based classifier, items of data that contain one or more of the plurality of specific categories of sensitive information by performing at least one DLP action specified by at least one DLP policy of the DLP system, wherein the DLP action is selected based at least in part on whether the item of data comprises a percentage of one or more of the plurality of specific categories of sensitive information that exceeds a predetermined percentage threshold.

2. The computer-implemented method of claim 1, wherein, for each training data set, the negative examples within the training data set comprise the positive examples from all other training data sets.

3. The computer-implemented method of claim 1, wherein using machine learning to train the machine learning-based classifier comprises, for each training data set:
    extracting a feature set from the training data set that comprises statistically significant features of the positive examples within the training data set and statistically significant features of the negative examples within the training data set;
    building a machine learning-based classification model from the feature set that is capable of indicating whether or not items of data contain the specific category of sensitive information associated with the training data set.

4. The computer-implemented method of claim 1, wherein the machine learning-based classifier detects items of data that contain more than one of the plurality of specific categories of sensitive information.

5. The computer-implemented method of claim 4, wherein, for each item of data that contains more than one of the plurality of specific categories of sensitive information, the machine learning-based classifier is configured to identify at least one of:
    the specific categories of sensitive information that the item of data contains;
    for each specific category of sensitive information that the item of data contains, the percentage of the item of data that comprises that specific category of sensitive information;
    for each specific category of sensitive information that the item of data contains, the specific portion of the item of data that contains that specific category of sensitive information.

6. The computer-implemented method of claim 1, wherein the DLP action comprises, for each specific category of sensitive information contained within the item of data, at least one of:
    restricting access to the item of data to entities that are authorized to access the specific category of sensitive information;
    restricting access to the portion of the item of data that contains the specific category of sensitive information to entities that are authorized to access the specific category of sensitive information;
    automatically appending a custom disclaimer to the item of data that applies to the category of sensitive information.

7. The computer-implemented method of claim 6, wherein restricting access to the portion of the item of data that contains the specific category of sensitive information to entities that are authorized to access the specific category of sensitive information comprises, prior to allowing an entity to access the item of data, redacting portions from the item of data that contain specific categories of sensitive information that the entity is not authorized to access.

8. The computer-implemented method of claim 7, further comprising replacing the redacted information with a notification that indicates that an entity does not have access rights to view the redacted information.

9. The system of claim 8, wherein the training module is configured to perform feature extraction multiple times, each time using a different feature-extraction algorithm.

10. The computer-implemented method of claim 1, wherein deploying the machine learning-based classifier within the DLP system comprises providing the machine learning-based classifier as part of the DLP policy to at least one of:
    a DLP agent installed on at least one client device;
    a DLP engine installed on at least one server configured to monitor a plurality of client devices.

11. The computer-implemented method of claim 1, further comprising, upon deploying the machine learning-based classifier within the DLP system:
- identifying an attempt to access at least one item of data via a data-loss vector;
- determining, using the machine learning-based classifier, that the item of data comprises a percentage of one or more of the plurality of specific categories of sensitive information that exceeds the predetermined percentage threshold;
- protecting at least a portion of the item of data by performing the DLP action specified by the DLP policy of the DLP system.

12. A system for generating machine learning-based classifiers for use in detecting specific categories of sensitive information, the system comprising:
- an identification module programmed to identify a plurality of specific categories of sensitive information to be protected by a data loss prevention (DLP) system;
- a training module programmed to:
  - obtain a training data set customized for each specific category of sensitive information that comprises a plurality of positive examples of data that fall within the specific category of sensitive information and a plurality of negative examples of data that do not fall within the specific category of sensitive information;
  - use machine learning to train, based on an analysis of the training data sets, at least one machine learning-based classifier to detect items of data that contain one or more of the plurality of specific categories of sensitive information;
- a deployment module programmed to deploy the machine learning-based classifier within the DLP system to enable the DLP system to detect and protect, using the machine learning-based classifier, items of data that contain one or more of the plurality of specific categories of sensitive information by performing at least one DLP action specified by at least one DLP policy of the DLP system, wherein the DLP action is selected based at least in part on whether the item of data comprises a percentage of one or more of the plurality of specific categories of sensitive information that exceeds a predetermined threshold;
- at least one hardware processor configured to execute at least one of the identification module, the training module, and the deployment module.

13. The system of claim 12, wherein, for each training data set, the negative examples within the training data set comprise the positive examples from all other training data sets.

14. The system of claim 12, wherein the machine learning-based classifier is configured to detect items of data that contain more than one of the plurality of specific categories of sensitive information and, for each item of data that contains more than one of the plurality of specific categories of sensitive information, the machine learning-based classifier is configured to identify at least one of:
- the specific categories of sensitive information that the item of data contains;
- for each specific category of sensitive information that the item of data contains, the percentage of the item of data that comprises that specific category of sensitive information;
- for each specific category of sensitive information that the item of data contains, the specific portion of the item of data that contains that specific category of sensitive information.

15. The system of claim 12, wherein the DLP action comprises, for each specific category of sensitive information contained within the item of data, at least one of:
- restricting access to the item of data to entities that are authorized to access the specific category of sensitive information;
- restricting access to the portion of the item of data that contains the specific category of sensitive information to entities that are authorized to access the specific category of sensitive information;
- automatically appending a custom disclaimer to the item of data that applies to the category of sensitive information.

16. The system of claim 12, wherein the deployment module deploys the machine learning-based classifier within the DLP system by providing the machine learning-based classifier as part of the DLP policy to at least one of:
- a DLP agent installed on at least one client device;
- a DLP engine installed on at least one server configured to monitor a plurality of client devices.

17. The system of claim 12, further comprising a DLP module programmed to:
- identify an attempt to access at least one item of data via a data-loss vector;
- determine, using the machine learning-based classifier, that the item of data contains one or more of the plurality of specific categories of sensitive information;
- protect at least a portion of the item of data in accordance with the DLP policy of the DLP system.

18. The system of claim 12, wherein the training module is configured to use machine learning to train the machine learning-based classifier by, for each training data set:
- extracting a feature set from the training data set that comprises statistically significant features of the positive examples within the training data set and statistically significant features of the negative examples within the training data set;
- building a machine learning-based classification model from the feature set that is capable of indicating whether or not items of data contain the specific category of sensitive information associated with the training data set.

19. The system of claim 18, further comprising at least one of:
- selecting the features within each feature set using a feature-extraction algorithm;
- weighting the features within each feature set using a feature-weighting algorithm.

20. A non-transitory computer-readable-storage medium comprising one or more computer-executable instructions that, when executed by at least one processor of a computing device, cause the computing device to:
- identify a plurality of specific categories of sensitive information to be protected by a data loss prevention (DLP) system;
- obtain a training data set customized for each specific category of sensitive information that comprises a plurality of positive examples of data that fall within the specific category of sensitive information and a plurality of negative examples of data that do not fall within the specific category of sensitive information;
- use machine learning to train, based on an analysis of the training data sets, at least one machine learning-based classifier to detect items of data that contain one or more of the plurality of specific categories of sensitive information;
- deploy the machine learning-based classifier within the DLP system to enable the DLP system to detect and protect, using the machine learning-based classifier, items of data that contain one or more of the plurality of specific categories of sensitive information by performing at least one DLP action specified by at least one policy of the DLP system, wherein the DLP action is selected based at least in part on whether the item of data comprises a specific percentage of one or more of the plurality of specific categories of sensitive information that exceeds a predetermined percentage threshold.

* * * * *